(12) United States Patent
Vandermeijden et al.

(10) Patent No.: US 9,665,214 B2
(45) Date of Patent: May 30, 2017

(54) SYSTEM AND METHODS FOR DETERMINING OBJECT INFORMATION USING SELECTIVELY FLOATED ELECTRODES

(75) Inventors: Tom R. Vandermeijden, Los Gatos, CA (US); Jeffrey A. Small, Rochester, NY (US)

(73) Assignee: Synaptics Incorporated, Santa Clara, CA (US)

( * ) Notice: Subject to any disclaimer, the term of this patent is extended or adjusted under 35 U.S.C. 154(b) by 1038 days.

(21) Appl. No.: 13/434,608

(22) Filed: Mar. 29, 2012

(65) Prior Publication Data

US 2013/0257784 A1    Oct. 3, 2013

(51) Int. Cl.
  *G06F 3/044*  (2006.01)
  *G06F 3/041*  (2006.01)
(52) U.S. Cl.
  CPC ............ *G06F 3/044* (2013.01); *G06F 3/0414* (2013.01)
(58) Field of Classification Search
  CPC combination set(s) only.
  See application file for complete search history.

(56) References Cited

U.S. PATENT DOCUMENTS

| | | | |
|---|---|---|---|
| 5,510,813 A | 4/1996 | Makinwa et al. | |
| 5,854,625 A | 12/1998 | Frisch et al. | |
| 5,942,733 A | 8/1999 | Allen et al. | |
| 5,945,980 A | 8/1999 | Moissev et al. | |
| 6,002,389 A | 12/1999 | Kasser | |
| 6,034,672 A | 3/2000 | Gaultier et al. | |
| 6,642,857 B1 | 11/2003 | Schediwy et al. | |
| 7,158,122 B2 | 1/2007 | Roberts | |
| 7,196,694 B2 | 3/2007 | Roberts | |
| 7,288,370 B1 | 10/2007 | Colavizza et al. | |

(Continued)

FOREIGN PATENT DOCUMENTS

| | | |
|---|---|---|
| EP | 1826657 A1 | 8/2007 |
| WO | 9402921 | 2/1994 |

OTHER PUBLICATIONS

United States Patent and Trademark Office, Final Office Action dated Feb. 19, 2013 for U.S. Appl. No. 12/948,455.
United States Patent and Trademark Office, Non-Final Office Action dated Feb. 6, 2013 for U.S. Appl. No. 12/968,000.

(Continued)

*Primary Examiner* — William Boddie
*Assistant Examiner* — Jeffrey A Parker
(74) *Attorney, Agent, or Firm* — Osha Liang LLP

(57) ABSTRACT

The embodiments described herein provide devices and methods that facilitate improved sensor devices. In one embodiment, a capacitive input device is provided that includes a processing system, a plurality of sensing electrodes configured to sense objects in a sensing region, a conductor, and a shield layer comprising at least one shield electrode, where the at least one shield electrode is disposed between the plurality of sensing electrodes and the conductor. The processing system is configured to operate in a first mode and a second mode. When operating in the first mode the processing system is configured to determine position information for objects in the sensing region using the plurality of sensing electrodes. When operating in a second mode the processing system is configured to electrically float the at least one shield electrode and to determine force information for objects in the sensing region using the plurality of sensing electrodes.

19 Claims, 9 Drawing Sheets

(56) References Cited

U.S. PATENT DOCUMENTS

| | | | |
|---|---|---|---|
| 7,511,702 | B2 | 3/2009 | Hotelling |
| 7,538,760 | B2 | 5/2009 | Hotelling et al. |
| 7,683,894 | B2 | 3/2010 | Kent |
| 8,618,428 | B2 | 12/2013 | Bulea |
| 2002/0149571 | A1 | 10/2002 | Roberts |
| 2003/0206162 | A1 | 11/2003 | Roberts |
| 2004/0227736 | A1 | 11/2004 | Kamrath et al. |
| 2006/0227114 | A1 | 10/2006 | Geaghan et al. |
| 2008/0078590 | A1 | 4/2008 | Sequine |
| 2009/0115733 | A1 | 5/2009 | Ma et al. |
| 2009/0243817 | A1 | 10/2009 | Son |
| 2010/0026655 | A1 | 2/2010 | Harley |
| 2010/0066670 | A1 | 3/2010 | Amm et al. |
| 2010/0139990 | A1 | 6/2010 | Westerman et al. |
| 2010/0200309 | A1 | 8/2010 | Yilmaz et al. |
| 2010/0277431 | A1 | 11/2010 | Klinghult |
| 2010/0308844 | A1 | 12/2010 | Day et al. |
| 2011/0153243 | A1 | 6/2011 | Modafe |
| 2011/0175671 | A1* | 7/2011 | Reynolds ............. 327/517 |
| 2011/0278078 | A1 | 11/2011 | Schediwy et al. |
| 2011/0298746 | A1 | 12/2011 | Hotelling |
| 2012/0068966 | A1 | 3/2012 | Washburn et al. |
| 2012/0081276 | A1 | 4/2012 | Ullrich et al. |
| 2012/0146935 | A1 | 6/2012 | Bulea |
| 2013/0033450 | A1* | 2/2013 | Coulson et al. ......... 345/174 |

OTHER PUBLICATIONS

USPTO, Office Action issued in U.S. Appl. No. 12/968,000, mailed May 6, 2013.

The International Bureau of WIPO, International Preliminary Report on Patentability in PCT International Application No. PCT/US2011/057731, mailed May 30, 2013.

European Patent Office, International Searching Authority, "International Search Report" mailed Apr. 10, 2012; International Appln. No. PCT/US2011/057731, filed Oct. 25, 2011.

The International Bureau of WIPO, International Preliminary Report on Patentability in PCT International Application No. PCT/US2011/063763, mailed Jun. 27, 2013.

United States Patent and Trademark Office, U.S. Non-final Office Action mailed Sep. 14, 2012 for U.S. Appl. No. 12/948,455.

The International Searching Authority, International Search Report and Written Opinion in PCT International Application No. PCT/US2013/034278, mailed Jul. 22, 2013.

USPTO, Office Action for U.S. Appl. No. 14/084,993 mailed Sep. 4, 2014.

The International Bureau of WIPO, International Preliminary Report on Patentability for International Application No. PCT/US2013/034278 mailed Oct. 9, 2014.

Korean Intellectual Property Office, International Searching Authority, "International Search Report and Written Opinion" mailed Jul. 11, 2012; International Appln. No. PCT/US2011/063763, filed Dec. 7, 2011.

* cited by examiner

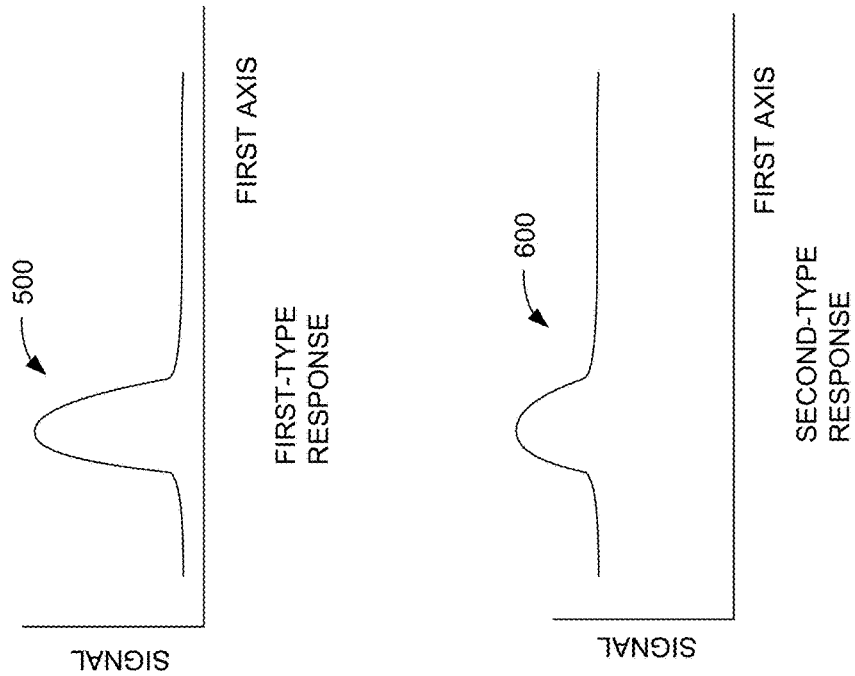
FIG. 5
FIG. 6
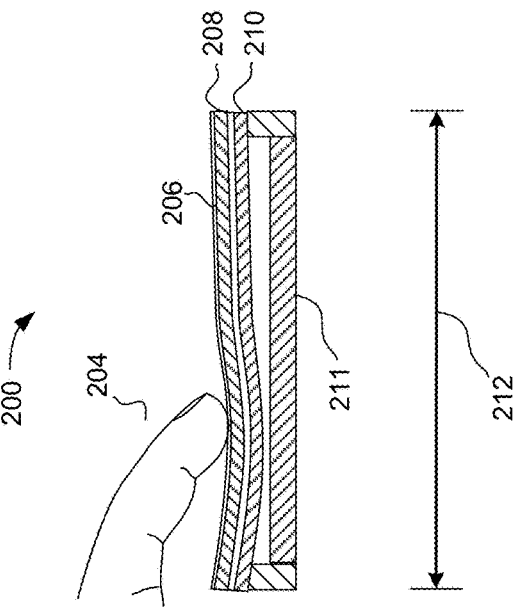
FIG. 4

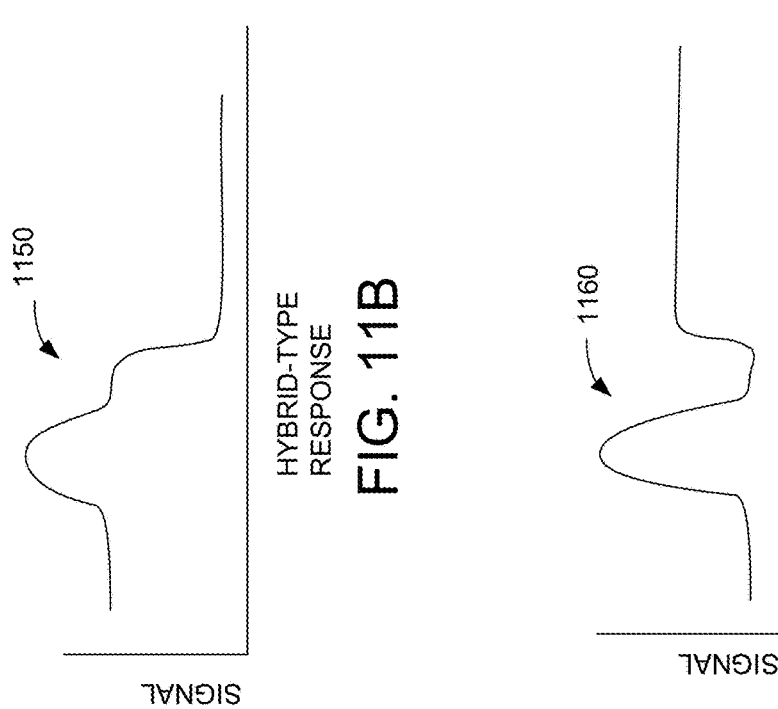
FIG. 11B
FIG. 11C
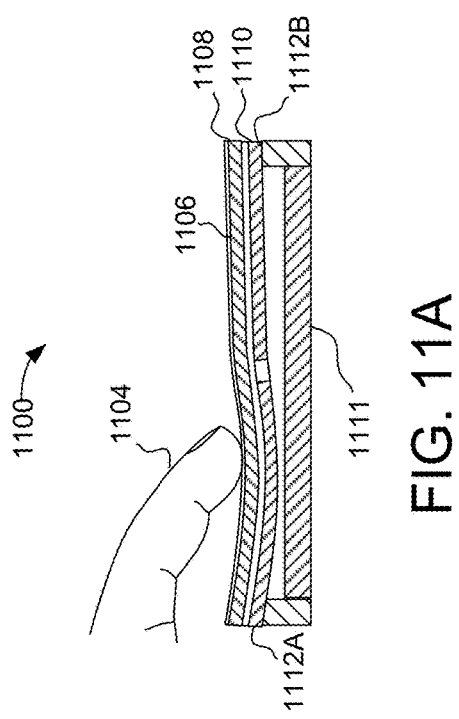
FIG. 11A

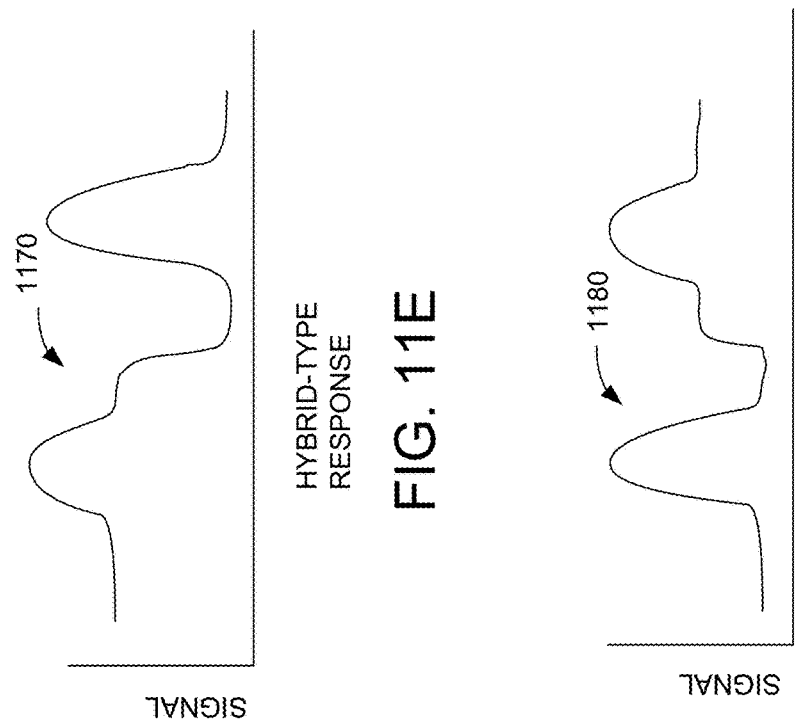
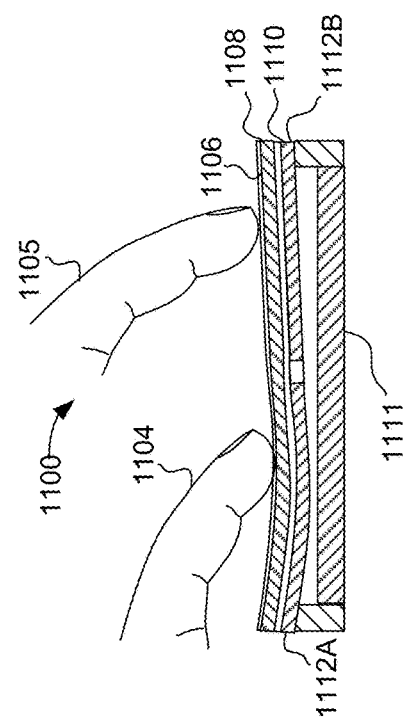

SYSTEM AND METHODS FOR DETERMINING OBJECT INFORMATION USING SELECTIVELY FLOATED ELECTRODES

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some proximity sensor devices are detrimentally affected by physical deflection of parts of the sensor devices. For example, when a user touches or pushes on an input surface of a proximity sensor device, the input surface and the underlying sensing electrodes may be deflected to such an extent that the deflection degrades the performance of the device. For example, some proximity sensor devices may thus produce inaccurate measurements, estimates, or other information. Such degradation may be evident in touch screen devices and non-touch screen devices.

Some proximity sensor devices, or electronic systems in communications with proximity sensor devices, would also benefit from information about forces applied to the input surfaces of the sensor devices.

Thus, methods and devices for addressing the above are desirable. Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved sensor devices. Specifically, the devices and methods provide the ability to determine object information for objects in a sensing region of a capacitive sensor device. Example object information includes positional information and force information, such as for objects applying force.

In one embodiment, a capacitive input device is provided that includes a plurality of sensing electrodes configured to sense objects in a sensing region, a conductor, and a shield layer comprising at least one shield electrode, where the at least one shield electrode is disposed between the plurality of sensing electrodes and the conductor. A processing system is coupled to the plurality of sensing electrodes and the at least one shield electrode. The processing system is configured to operate in a first mode and a second mode. When operating in the first mode the processing system is configured to determine position information for objects in the sensing region using the plurality of sensing electrodes. When operating in a second mode the processing system is configured to electrically float the at least one shield electrode and to determine force information for objects in the sensing region using the plurality of sensing electrodes.

In a second embodiment, a sensor device is provided that includes an input surface, a plurality of transmitter electrodes and receiver electrodes, a shield layer, a display disposed proximate the shield layer, and a processing system. The plurality of transmitter electrodes and receiver electrodes are configured to capacitively sense objects in a sensing region. The shield layer comprises at least one shield electrode disposed proximate the plurality of transmitter electrodes and receiver electrodes. The plurality of transmitter electrodes, receiver electrodes, and the shield layer are configured to deflect toward the display in response to force applied by an input object to the input surface. The processing system is coupled to the plurality of sensing electrodes and the at least one shield electrode. The processing system is configured to selectively operate in a first mode and in a second mode. When operating in the first mode the processing system electrically drives the at least one shield electrode to an electrical potential while driving the plurality of transmitter electrodes and receiving first type resulting signals using the plurality of receiver sensor electrodes. When operating in the second mode the processing system electrically floats the at least one shield electrode while driving the plurality of transmitter electrodes, and receiving second type resulting signal using the plurality of receiver sensor electrodes. The processing system is further configured to determine positional information for objects in the sensing region using at least the first type resulting signals, and to determine force information for objects in the sensing region using at least the second type resulting signals.

Finally, in third embodiment a processing system for a capacitive input device is provided. The processing system includes a sensor module comprising sensor circuitry and a determination module. The sensor module is configured to selectively operate in a first mode and a second mode. When operating in the first mode the sensor module generates resulting signals of a first type by driving a plurality of sensing electrodes configured to sense objects in a sensing region while driving a shield layer. The resulting signals of the first type are indicative of objects in the sensing region. When operating in the second mode the sensor module generates resulting signals of a second type by driving the plurality of sensing electrodes configured to sense objects in the sensing region while floating the shield layer. The determination module is configured to determine positional information for objects in the sensing region using at least one of the resulting signals of the first type and the resulting signals of the second type. Finally, the determination module is configured to determine force information for objects in the sensing region using at least the resulting signals of the second type.

In each of these embodiments the position information and force information may be used to provide user input in a variety of devices.

BRIEF DESCRIPTION OF DRAWINGS

The preferred exemplary embodiment of the present invention will hereinafter be described in conjunction with the appended drawings, where like designations denote like elements, and:

FIGS. 3 and 4 are cross sectional side views of an input device in accordance with an embodiment of the invention;

FIGS. 5 and 6 are projections of an exemplary first-type response and second-type response in accordance with an embodiment of the invention;

FIG. 11A and FIG. D are cross sectional side views of an exemplary input device, and FIGS. 11B, 11C, 11E and 11F are projections of exemplary hybrid-type responses in accordance with an embodiment of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
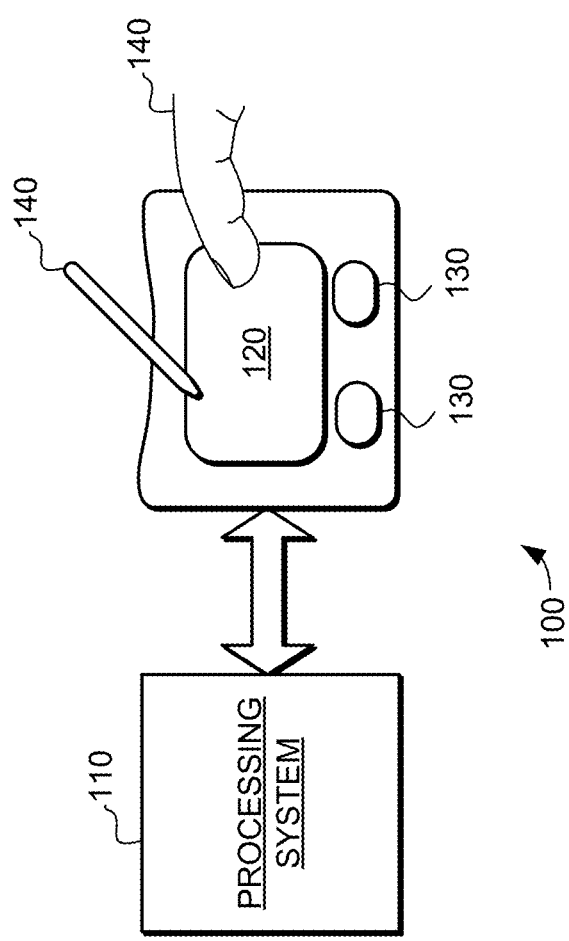
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In accordance with some embodiments, a processing system includes a sensor module comprising sensor circuitry and a determination module. In these embodiments the sensor module is configured to selectively operate in a first mode and a second mode. When operating in the first mode the sensor module generates resulting signals of a first type by driving a plurality of sensing electrodes configured to sense objects in a sensing region while driving a shield layer. The resulting signals of the first type are indicative of objects in the sensing region. When operating in the second mode the sensor module generates resulting signals of a second type by driving the plurality of sensing electrodes configured to sense objects in the sensing region while floating the shield layer. The determination module is configured to determine positional information for objects in the sensing region using at least one of the resulting signals of the first type and the resulting signals of the second type. Finally, the determination module is configured to determine force information for objects in the sensing region using at least the resulting signals of the second type.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass information about force(s) regardless of format. Force information may be in any appropriate form and of any appropriate level of complexity. For example, some embodiments determine an estimate of a single resulting force regardless of the number of forces that combine to produce the resultant force (e.g. forces applied by one or more objects apply forces to an input surface). Some embodiments determine an estimate for the force applied by each object, when multiple objects simultaneously apply forces to the surface. As another example, force information may be of any number of bits of resolution. That is, the force information may be a single bit, indicating whether or not an applied force (or resultant force) is beyond a force threshold; or, the force information may be of multiple bits, and represent force to a finer resolution. As a further example, force information may indicate relative or absolute force measurements. As yet further examples, some embodiments combine force information to provide a map or an "image" of the force applied by the object(s) to the input surface. Finally, force information can include indications of in/out movement of the device. Historical data of force information may also be determined and/or stored.

The positional information and force information are both types of object information that may be used to facilitate a full range of interface inputs, including use of the proximity sensor device as a pointing device for selection, cursor control, scrolling, and other functions.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one embodiment, the input device 100 comprises a plurality of sensing electrodes configured to sense objects in the sensing region 120, a conductor, and a shield layer comprising at least one shield electrode, where the at least one shield electrode is disposed between the plurality of sensing electrodes and the conductor. The processing system 110 is coupled to the plurality of sensing electrodes and the at least one shield electrode. The processing system is configured to operate in a first mode and a second mode. When operating in the first mode the processing system 110 is configured to determine position information for objects in the sensing region 120 using the plurality of sensing electrodes. When operating in a second mode the processing system is configured to electrically float the at least one shield electrode and to determine force information for objects in the sensing region 120 using the plurality of sensing electrodes.

In a second embodiment, the input device 100 includes an input surface, a plurality of transmitter electrodes and receiver electrodes, a shield layer, a display disposed proximate the shield layer. The plurality of transmitter electrodes and receiver electrodes are configured to capacitively sense objects in the sensing region 120. The shield layer comprises at least one shield electrode disposed proximate the plurality of transmitter electrodes and receiver electrodes. The plurality of transmitter electrodes, receiver electrodes, and the shield layer are configured to deflect toward the display in response to force applied by an input object to the input surface. The processing system 110 is coupled to the plurality of sensing electrodes and the at least one shield electrode. The processing system 110 is configured to selectively operate in a first mode and in a second mode. When operating in the first mode the processing system 110 electrically drives the at least one shield electrode to an electrical potential while driving the plurality of transmitter electrodes and receiving first type resulting signals using the plurality of receiver sensor electrodes. When operating in the second mode the processing system 110 electrically floats the at least one shield electrode while driving the plurality of transmitter electrodes, and receiving second type resulting signal using the plurality of receiver sensor electrodes. The processing system 110 is further configured to determine positional information for objects in the sensing region using at least the first type resulting signals, and to determine force information for objects in the sensing region using at least the second type resulting signals.

As described above, a shield layer is provided proximate to the plurality of sensor electrodes. In general, such a shield layer would be configured to shield the sensor device from unwanted capacitive coupling and/or noise sources, for example, to shield the plurality of sensing electrodes from capacitively coupling with other conductors that are part of or proximate the sensor. In one specific embodiment, the shield layer would be used to shield sensing electrodes from capacitive coupling with conductors that are part of an underlying display screen. In a typical embodiment the shield layer comprises at least one shield electrode The at least one shield electrode is coupled to the processing system 110 to facilitate the selective driving of the at least one shield electrodes to an electrical potential. Driving the at least one shield electrode to a suitable electrical potential facilitates the shielding of the sensing electrodes by the shield layer. For example, the processing system 110 may be configured to selectively drive the at least one shield electrode to ground to facilitate effective shield of the sensing electrodes while operating in a first mode to generate and receive first type resulting signals. These first-type resulting signals may then be used to generate positional information for objects in the sensing region.

Furthermore, the at least one shield electrode is configured to be selectively floated. As will be described in greater detail below, the selective floating of the at least one shield electrodes in the shield layer facilitates operation in a second mode to generate and receive second-type resulting signals. These second-type resulting signals may then be used to generate force information for objects applying force to the input device.

It should be noted that by the term "selectively floated" it is meant that when the electrode is floated that no significant ohmic coupling exists between the floating shield electrode and other circuit elements of the input device, so that no meaningful amount of charge can flow onto or off of the floating shield electrode under normal circumstances. Of course, any charge present on the conductive floating shield electrode can still redistribute itself in the presence of an electric field. Thus, the shield electrode is capacitively coupled to the sensor electrodes, but it is not ohmically coupled significantly to those or other circuit elements.

The shield layer and the at least one shield electrode may comprise any suitable number and configuration of shield electrodes. In many cases, the shield layer may comprise a single shield electrode. In other embodiments, the shield layer may comprise multiple shield electrodes. In such an embodiment each shield electrode may be individually drivable such that one or more shield electrodes may be selectively driven to an electrical potential while one or more other shield electrodes are electrically floated. As will be described in greater detail below, such a configuration facilitates the generation of signals that may be used to determine position information and force information for objects causing deflection of the sensing electrodes.

Finally, in some embodiments the shield electrodes may be configured to receive resulting signals. In such an embodiment the processing system 110 may be configured to operate in a third mode where such resulting signals of a third-type received by the shield electrode are also used to determine force information for objects in the sensing region.

As noted above, the input device 100 may further comprise one or more other conductors proximate to the shield layer and plurality of sensing electrodes. Such conductors may be a source of noise to the sensing electrodes. Furthermore, such other conductors may cause changes in capacitive coupling of the sensing electrodes. In a typical embodiment, the shield layer is configured between plurality of sensing electrodes and the conductors.

In some embodiments the conductors may comprises all or part of a display screen underlying the plurality of sensing electrodes. A typical display screen implementation could include several such conductors used for display operation. As such, these conductors could be driven to one or more voltages during display operation, such as the one or more $V_{com}$ electrodes of liquid crystal display screens (LCDs) that are driven to a constant $V_{com}$ voltage or to multiple voltages during display operation.

In some embodiments the input device 100 is configured such that force applied by one or more input objects 104 to the input surface causes the plurality of sensing electrodes and shield layer to deflect relative to the underlying conductor. It should be noted that "deflection" is used here to encompass all types of motion or change in configuration of the plurality of sensing electrodes in response to force applied to the input surface by one or more input objects, and "deflect" is used here to refer to the action of deflection. For example, deflection includes substantially rigid motion, where a body translates or rotates without changing in shape. For example, rigid motion of an electrode may encompass rotation or translation of the electrode without a change in electrode characteristics such as size and curvature. As another example, deflection includes substantially non-rigid motion, where a body deforms or changes in shape. For example, non-rigid motion of an electrode includes stretching, compression, bending, and twisting. Deflection also includes combined rigid and non-rigid motion.

It should be noted that the type of deflection occurring in response to force by the input objects will depend largely upon the structure of the input device. For example, substantially rigid motion of input device components typically occur where those components are configured to be substantially more rigid relative to their mountings, supports, and other relevant aspects of their environment. As another example, non-rigid motion of input device components typically occur where those components are configured to be substantially less rigid relative to their mountings, supports, and other relevant aspects of their environment.

As described above, the input device 100 is configured to determine both positional information and force information using the first-type resulting signals and the second-type resulting signals. The input device 100 can be configured to determine this positional information and force information using a variety of different techniques. For example, the positional information can be determined using the first-type resulting signals or a combination of both the first-type resulting signals and the second-type resulting signals. Likewise, the force information can be determined using the second-type resulting signals or a combination of both the second-type resulting signals and the first-type resulting signals.

In one particular embodiment, the input device 100 is configured to determine the force information by determining a deflection response using the resulting signals. Specifically, the deflection response may be determined using at least the second-type resulting signals. The term "deflection response" is used here to refer to a measure or estimate of change in the capacitive coupling to the plurality of sensing electrodes that occurs due to the deflection. That is, the deflection causes the plurality of sensing electrodes and the at least one shield electrode to deflect. This changes the capacitive coupling experienced by the sensing electrodes, and changes the sensor values that are produced using the at least one sensing electrode. Thus, the "deflection response" refers to an electrical response to the deflection. Such a determined deflection response can thus be used to determine force information for the objects causing the deflection. Examples of such techniques will be described in greater detail below.

Such a deflection response may comprise any suitable estimate or measure of the response. As such, the deflection response may be quantified in capacitance units, or some other units that reflect the changes in capacitance. In typical embodiments the deflection response is produced by accounting (in whole or in part) for the effects of capacitive coupling between the plurality of sensing electrodes the at least one object causing the deflection, thus providing an accurate estimate of the deflection response.

Similarly, "object response" is used here to refer to a measure or estimate of change in the capacitive coupling to the sensing electrodes that occur due to input object(s) being present and/or moving in the sensing region. Again, such an object response may be quantified in the values determined by the input device (e.g. by the input device's processing system or some other processing element) that correspond to an estimate of the object response.

Figure 3:
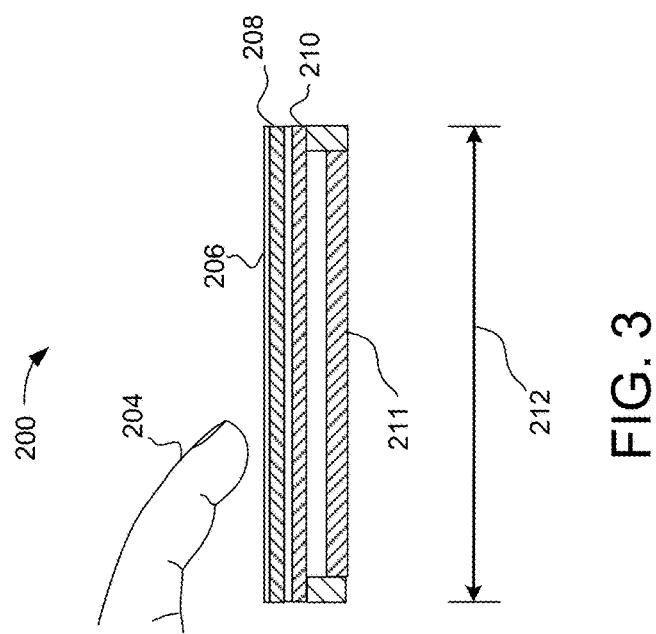
Figure 2:
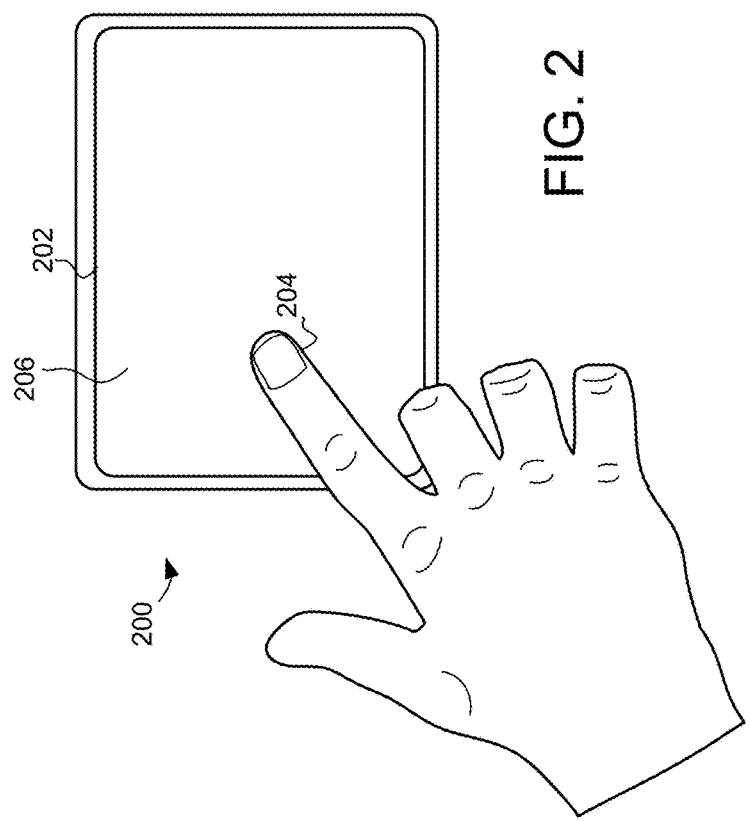
FIG. 2 is a top view of an input device in accordance with an embodiment of the invention.

Turning now to FIGS. 2 and 3, a top view and cross sectional side of an exemplary input device 200 are illustrated. The input device 200 includes an input surface 206 and a plurality of sensing electrodes 208, a shield layer 210, and a conductor 211. A first axis 212 is also shown for orientation purposes. Also presented in FIGS. 2 and 3 is an input object 204 (a finger is shown, but this is just one example) proximate to the input device 200. The input device 200 also includes a processing system (not shown) communicatively coupled to the plurality of sensing electrodes. The input device 200 is configured to capacitively sense objects (e.g., finger 204) in a sensing region 202 using the plurality of sensing electrodes 208.

As was described above, the plurality of sensing electrodes 208 can comprise any number of sensor electrodes in any of a variety of arrangements, including electrodes for both trans-capacitive and absolute capacitive sensing. For example, the plurality of sensing electrodes 208 can comprise a set of sensor electrodes aligned along one axis, arrays of electrodes aligned along orthogonal axes, and other configurations or spatial arrangements. Similarly, the plurality of sensing electrodes 208 can be of any appropriate shape. For example, the plurality of sensing electrodes can reside in a single plane or be non-planer, and can have any number of curvy or linear portions, and of any appropriate size.

The input device 200 is configured such that force applied by the input object 204 to the input surface 206 causes at least a portion of the plurality of sensing electrodes 208 and the shield layer 210 to deflect relative to the conductor 211. As will be described in greater detail below, the capacitive effects of such deflection may be used to determine force information for objects causing the deflection.

The shield layer 210 may comprise any suitable number and configuration of shield electrodes. In many cases, the shield layer 210 may comprise a single shield electrode configured to be selectively floated and driven to capacitively shield the sensing electrodes 208. In other embodiments, the shield layer 210 may comprise multiple shield electrodes. In such an embodiment each shield electrode may be individually drivable such that one or more shield electrodes may be driven to an electrical potential while simultaneously one or more other shield electrodes in the shield layer 210 are electrically floated.

The conductor 211 may be in a variety of forms and structures. In the illustrated embodiment, the shield layer 210 is situated between plurality of sensing electrodes 208 and the conductor 211. As such, the shield layer 210 may be used to capacitively shield the plurality of sensing electrodes 208 from the effects of the conductor 211.

As one particular example, in some embodiments, the input device 200 comprises a display screen underlying the plurality of sensing electrodes 208, and the conductor 211 may be all or part of the display screen. In this case the conductor 211 may comprise a display electrode that is routinely driven to one or more voltages during display operation, such as the one or more Vcom electrodes of liquid crystal display screens (LCDs) that are driven to a constant Vcom voltage or to multiple voltages during display operation.

As described above, the shield layer 210 is configured to shield the sensor device from unwanted capacitive coupling, and in particular unwanted changes in capacitive coupling with the conductor 211. In a typical embodiment the shield layer 210 comprises at least one shield electrode, and in some embodiments comprises a plurality of shield electrodes. The shield electrode(s) are coupled to the processing system to facilitate the selective driving and floating of the shield electrodes to suitable electrical potentials for shielding. Specifically, the processing system is coupled to the at least one shield electrodes to allow the shield electrodes to be actively driven during one operational mode and floated during second operational mode.

Driving the at least one shield electrode to a suitable electrical potential facilitates the shielding of the sensing electrodes 208 by the shield layer during the first mode. For example, the processing system may be configured to drive the at least one shield electrode to ground to facilitate effective shield of the sensing electrodes 208 while operating in a first mode to generate and receive first-type resulting signals. When driven to ground or other suitable potential, the at least one shield electrodes can effectively shield the sensing electrodes 208 from the negative effects of capacitive coupling to other elements, including the conductor 211. While functioning in such a first mode, the processing system operates to generate and receive first-type resulting signals which may be used to determine positional information for objects in the sensing region. This facilitates accurate capacitive determination of object location for input objects in the sensing region.

In contrast, floating the at least one shield electrode facilitates operation in a second mode to generate and receive second-type resulting signals. These second-type resulting signals may be used to generate force information for objects in the sensing region, and in particular, for objects causing deflection of the sensing electrodes 208.

Specifically, when floating during operation the at least one shield electrode(s) can collect and hold charge. A change in charge on the at least one shield electrode tends to effect the capacitance of the sensing electrodes. In an input device with trans-capacitive sensing, the change in charge on the at least one shield layer will result in a change in the measured trans-capacitance between sensing electrodes.

As was described above, in some embodiments the input device is configured such that force applied by one or more input objects to the input surface 206 causes the plurality of sensing electrodes 208 and shield layer 210 to deflect relative to the underlying conductor 211. Turning now to FIG. 4, the input device 200 is illustrated with the input object 204 applying force to the input surface 206, such that the plurality of sensing electrodes 208 and shield layer 210 deflects. In this illustrated example, the plurality of sensing electrodes 208 and shield layer 210 are both deflecting toward the conductor 211. As described above, this deflection of the plurality of sensing electrodes 208 changes the capacitance measured by the plurality of sensing electrodes 208.

Specifically, the deflection of the shield layer 210 causes at least some of the shield electrodes in the shield layer 210 to move close to the conductor 211. When the shield electrodes are floating, in one embodiment, this causes an increase of charge to build on the shield electrodes. Because the shield electrodes are conductive but floating, the charge tends to spread out across the shield electrode(s). Such an increase in charge causes a decrease in the measured transcapacitance between sensing electrodes. This effect generally occurs across all the sensing electrodes that are proximate a floating shield electrode, with the effect proportional to the amount of deflection toward the conductor. As such, in the second mode this effect can be determined from the second-type resulting signals and used to determine force information for the input objects causing the deflection.

A variety of different techniques can be used to determine the force information using the second-type resulting signals. In general, the second-type resulting signals will have a generalized increase in magnitude when the shield electrode is deflected toward the conductor. This generalized increased can be measured and used to determine an estimate of the force being applied by the input object. For example, the second-type resulting signals can be compared to first-type resulting signals or appropriate baseline values to determine a measure of the generalized increased. This measure of the generalized increase can then be used to determine an estimate of the force being applied. For example, by applying one or more functions or scaling factors to the measure.

In some embodiments the position of the input object applying the force may be used in determining a force estimate from the measure of the generalized increase. For example, in some implementations the relationship between the amount of the deflection and the force applied may be dependent upon the location of object applying force in the sensing region. This will typically occur where the amount of deflection as a function of force is greater closer to the center of the sensing region then near the edges. In such an embodiment the position of the input object can be used in determining force estimates from the measure of the generalized increased.

As another specific example of a technique for determining force information, the resulting signals may be used to determine a deflection response. This deflection response may then be used to determine force information. Such an embodiment will be described in greater detail below.

FIGS. 5 and 6 illustrate an exemplary first-type response and second-type response for the input device 200. The examples of FIGS. 5-6 illustrate the responses along a cross-section of a sensor (such as what may be associated with a row or column of pixels in an imaging senor), a projection of responses (such as what may be associated with a profile sensor), or some other appropriate one-dimensional representation. Turning now to FIG. 5, an example of a first-type response 500 associated with the plurality of sensing electrodes 208 is illustrated in graphical form. The first-type response 500 is exemplary of the type of response that would be generated when operating in the first mode with the shield electrodes driven to an appropriate electrical potential for shielding. This resulting first-type response 500 shows a well-defined and high magnitude peak that corresponds to the location of the finger 204 in the sensing region. The resulting signals thus provide clean signals with which object position information can be calculated using any suitable technique. For example, position information may be determined using data analysis methods such as detecting peaks, calculating centroids, etc.

It should be noted that since the first-type response 500 is generated with the shield electrodes driven to a shielding electrical potential, and thus when the effects of the conductor 211 are shielded from the sensing electrodes 208, that such a first-type response 500 could be generated in either of the scenarios illustrated in FIGS. 3 and 4.

Turning now to FIG. 6, an example of a second-type response 600 associated with the plurality of sensing electrodes 208 is illustrated in graphical form. Specifically, FIG. 6 shows an exemplary second-type response 600 for the scenario illustrated in FIG. 6.

The second-type response 600 is exemplary of the type of response that would be generated when operating in the second mode with the shield electrodes electrically floating. When the shield electrodes are floating the deflection of the shield layer 210 towards the conductor 211 causes an increase of charge to build on the shield electrodes. Because the shield electrodes are conductive but floating, the charge tends to spread out across the shield electrode. This causes a relative decrease in measured capacitance between sensing electrodes, which is manifest as a generalized increase in the second-type response 600. This generalized increased in the second-type response 600 can be described as a rising bathwater effect. This effect generally occurs across all the sensing electrodes that are proximate a floating shield electrode that has moved closer to the conductor 211, with the effect proportional to the amount of deflection toward the conductor 211. As such, in the second mode this effect can be determined from the second-type resulting signals and used to determine force information for the input objects causing the deflection.

For example, the second-type response can be considered to be the superposition of an object position response caused by the capacitive effects of the object in the sensing region and a deflection response caused by deflection of the shield electrodes toward the conductor 211. Thus, a deflection response proportional to deflection can be determined by removing the effects of the object response from the second-type response.

In one particular example, an object response corresponding to the capacitive effects of the object may be generated from the first-type response, and then subtracted from a determined second-type response. The resulting deflection response would be proportional to the amount of deflection caused by the input objects and could thus be used to determine force information for such input objects. It should also be noted that changes associated with the object response are concentrated in the portions of the plurality of sensing electrodes 208 near the input object 204, since the changes to the electric field caused by the presence and motion of the input object 204 are relatively localized. Meanwhile, the changes associated with the deflection response tend to cover a larger portion. However, that is not the case in some embodiments.

The first-type response 500 and second-type response 600 are examples of the responses that would be generated from first-type resulting signals and second-type resulting signals. In a typical embodiment, the input device (such as input device 200) is configured to obtain a set of sensor values using plurality of sensing electrodes. The set of sensor values are likely quantized, and formed of a discrete set of values that indicate measurements made using the plurality of sensing electrodes. When obtained during operation in the first mode these sensor values are based on first-type resulting signals and are used to generate first-type responses such as first-type response 500. When obtained in the second mode, these sensor values are based on second-type resulting signals and used to generate second-type responses such as second-type response 600.

These responses, including first-type responses, second-type responses, object responses and deflection responses may be in any appropriate form, including as discrete values, coefficients of functions, functions, and the like. In some embodiments, the sensor resulting signals and responses are made along one dimension, such as along the first axis of FIGS. 3-4. This may be the case in embodiments designed to provide projections of input along particular axes or planes (e.g. "profile" sensors). For example, profile sensors may generate sets of sensor values for defined coordinate systems, such as "X" and "Y" coordinates if using Cartesian coordinate systems.

Responses may also be made along one dimension in embodiments designed to provide images of two or higher dimensions, where particular one-dimensional sections or slices of the image are used in determining responses. For example, one or multiple one-dimensional slices may be taken that intersect a peak (or multiple peaks) in the image, As another example, one or multiple one-dimensional slices may be taken, where each pass through a same estimated position of an input object (or through different estimated positions of multiple input objects).

In embodiments configured to provide images of two, three, or more dimensions, the resulting signals and responses may be made along two dimensions (taking two-dimensional sections as appropriate). This approach can also be analogized to three and higher dimensions.

Figure 7:
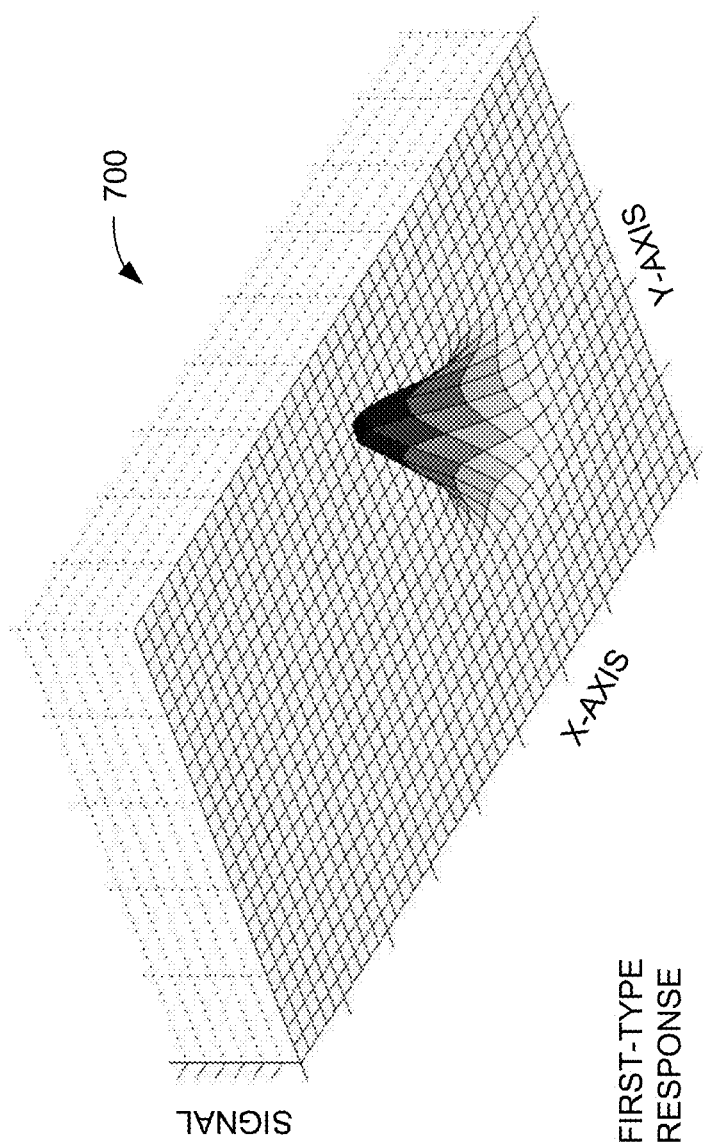
FIGS. 7, 8 and 9 are surface plots representing an exemplary first-type response, second-type response and deflection response in accordance with an embodiment of the invention.
Figure 8:
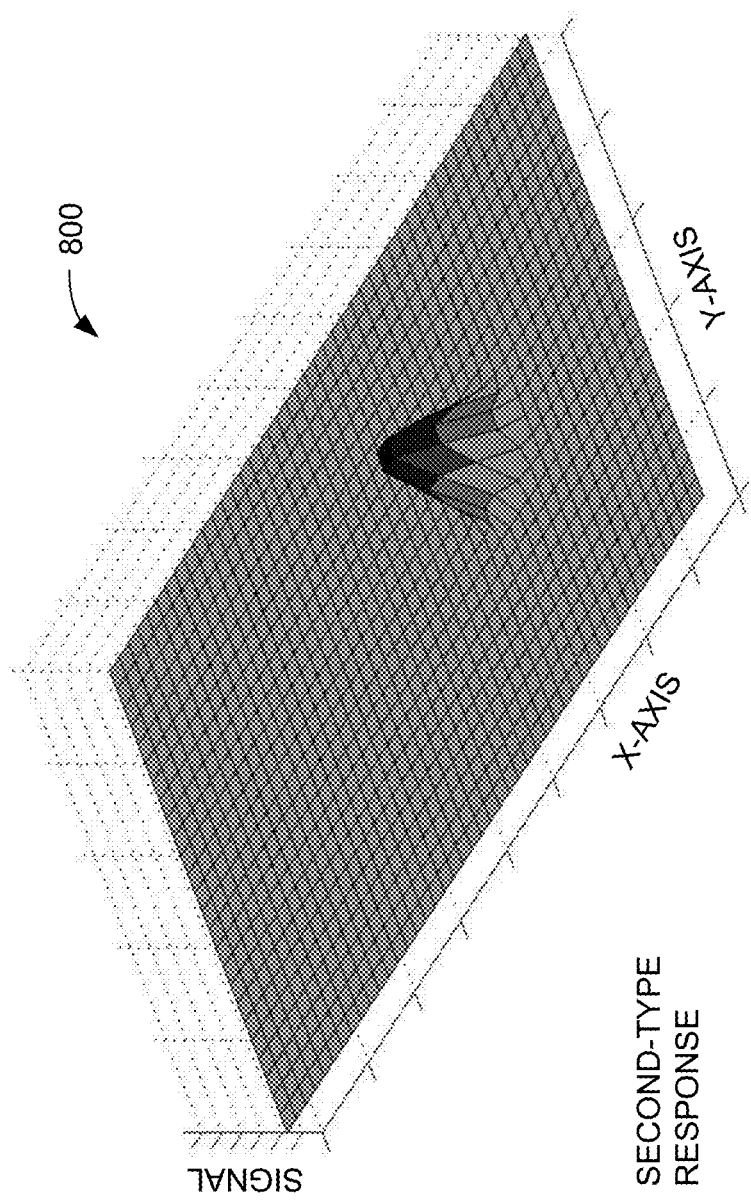
Figure 9:
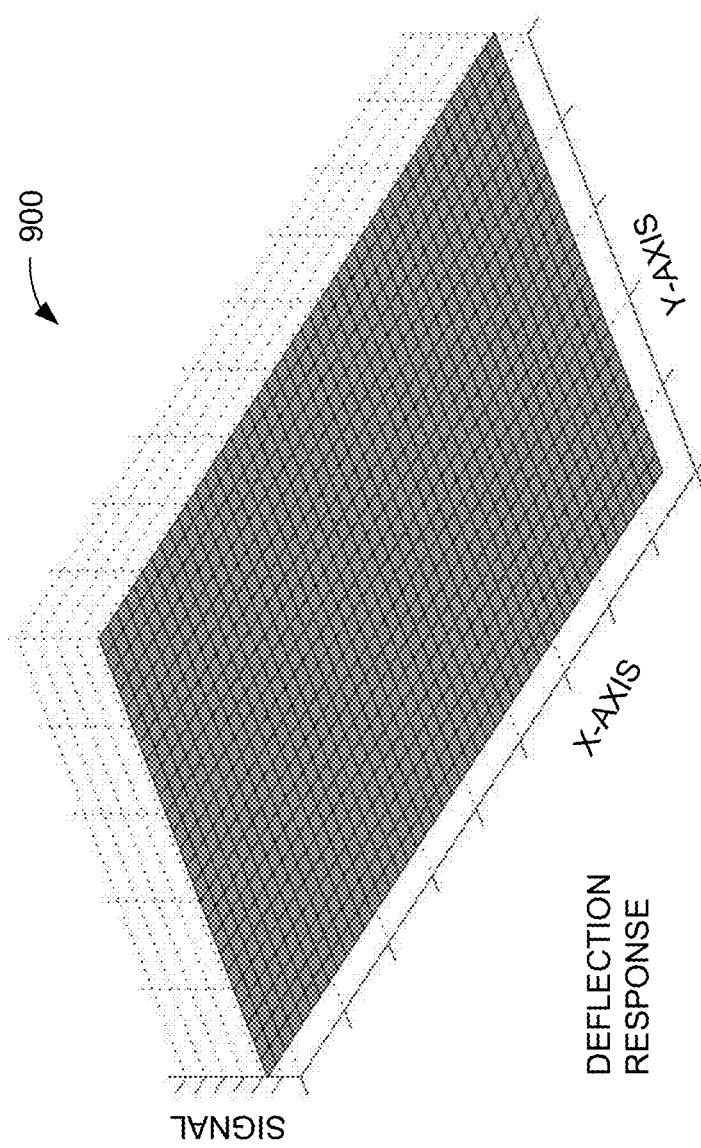

FIGS. 7-9 illustrate the first-type response, the second-type response, and the deflection response as a surface plots spanning first and second axes and corresponding to the sensing region. The first and second axes may be X and Y axes. FIGS. 7-9 illustrate these responses as two dimensional "images" of capacitive effects in the sensing region.

Turning now to FIG. 7, an exemplary two dimensional first-type response 700 is illustrated as surface plot. Like the example of FIG. 5, first-type response 700 is primarily an object response, as the effects of any deflection are largely prevented by the driven shield layer 210.

Turning now to FIG. 8, an exemplary two dimensional second-type response 800 is illustrated as surface plot. The second-type response 800 is exemplary of the type of response that would be generated when operating in the second mode with the shield electrodes electrically floating. When the shield electrodes are floating the deflection of the shield layer 210 towards the conductor 211 causes an increase of charge to build on the shield electrodes. Because the shield electrodes are conductive but floating, the charge tends to spread out across the shield electrode. This causes a relative decrease in measured capacitance between sensing electrodes, which is manifest as a generalized increase in the second-type response 800. Again, this creates a "rising bathwater" effect as shown in FIG. 8. This effect generally occurs across all the sensing electrodes that are proximate a floating shield electrode that has moved closer to the conductor 211, with the effect proportional to the amount of deflection toward the conductor 211.

Like the example of FIG. 6, the second-type response 700 includes both the capacitive effects of object presence (the object response) and the capacitive effects of the deflection (the deflection response). Thus, the second-type response 700 can be considered to be the superposition of an object position response caused by the capacitive effects of the object in the sensing region and a deflection response caused by deflection of the shield electrodes toward the conductor 211. Thus, a deflection response proportional to deflection can be determined by removing the effects of the object response from the second-type response.

Turning now to FIG. 9, an exemplary two dimensional deflection response 900 is illustrated as surface plot. The deflection response 900 is exemplary of the type of response that may be generated by substantially removing the effects of the object presence from the second-type response 700. In one particular example, an object response corresponding to the capacitive effects of the object may be generated from the first-type response, and then subtracted from a determined second-type response. The resulting deflection response would be proportional to the amount of deflection caused by the input objects and could thus be used to determine force information for such input objects. For example, by quantifying the deflection response using any suitable technique. For example, a measure of magnitude, average, mean or volume of the deflection response can be determined and used to determine an estimate of the force being applied by the input object.

In accordance with the embodiments of the invention, a variety of different techniques may be used to determine the estimated deflection response. Some techniques are based on an assumption that the physical deflection (and the associated electrostatic changes) would be similar to a particular shape or magnitude. Some techniques use filters or thresholds to remove or reduce the object response effects from the sensor values. Some techniques include fitting curves to part or all of the sensor values. Some techniques use estimated position(s) of the object(s) (in contact with the input device or in the sensing region of the input device) to effectuate accounting for the capacitive effects of the object(s). Various embodiments may use these techniques in isolation, or in combination. For example, some embodiments may use position estimates with curve fits to produce estimated deflection responses. As another example, some embodiments may use thresholds and filters both to produce estimated deflection responses. Other examples use any combination and number of assumptions of deflection shapes, filters, thresholds, curve fits, and other techniques.

As described above, the input devices described herein are implemented with a shield layer that includes at least one shield electrode that may be selectively floated and driven. In some embodiments, such a shield layer may comprise any suitable number and configuration of shield electrodes. In such an embodiment each shield electrode may be in individually drivable such that one or more shield electrodes may be driven to electrical potential while simultaneously one or more other shield electrodes in the shield layer are electrically floated.

In such embodiments the input device may be operated such that some portion of the sensing region is sensed in the first operating mode, while other portions are sensed in the second operating mode. Thus, first-type resulting signals may be generated for some portion of the sensing region, while second-type resulting signals generated for other portions of the sensing region. Such sensing procedures may be used to determine force information for input objects in multiple regions.

Figure 10C:
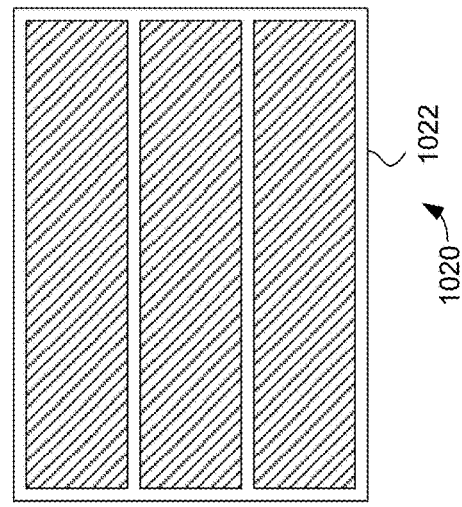
FIG. 10 is a top view of shield electrodes in accordance with embodiments of the invention.

Turning now to FIG. 10, top views of several example shield layers are illustrated. Each of these top views shows a different exemplary configuration of shield electrodes in a shield layer.

Figure 10B:
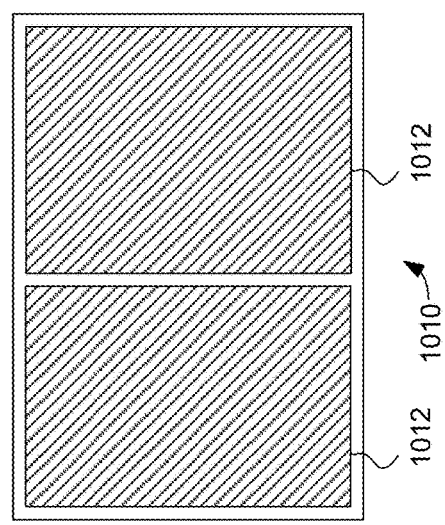
Figure 10A:
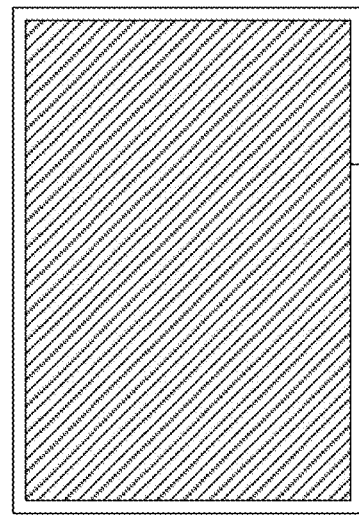

Turning to FIG. 10A, an exemplary shield layer 1000 is shown that includes a single shield electrode 1002. Turning to FIG. 10B, an exemplary shield layer 1010 is shown that includes a two shield electrode 1012. Finally, turning to FIG. 10C, an exemplary shield layer 1020 is shown that includes a three shield electrodes 1022. Again, these are just examples of the types of configurations that may be used to implement the shield layer.

Turning now to FIGS. 11A-F, cross-sectional sides of an exemplary input device 1100 are illustrated with exemplary hybrid-type responses 1150, 1160, 1170 and 1180. Like the embodiment in FIG. 2, the input device 1100 includes an input surface 1106 and a plurality of sensing electrodes 1108, a shield layer 1110, and a conductor 1111.

In the embodiment of FIG. 11, the shield layer includes 1110 includes two shield electrodes 1112A and 1112B, similar to those illustrated in FIG. 10B. In such an embodiment the shield electrodes 1112A and 1112B may be in individually drivable such that one or more shield electrodes may be driven to electrical potential while simultaneously one or more other shield electrodes in the shield layer 1110 are electrically floated.

In FIG. 11A the input device 1100 is illustrated with the input object 1104 applying force to the input surface 1106, such that the plurality of sensing electrodes 1108 and shield layer 1110 deflects. In this illustrated example, the plurality of sensing electrodes 1108 and shield layer 1110 are both deflecting toward the conductor 1111.

The deflection of the shield layer 1110 causes at least some of the shield electrodes in the shield layer 1110 to move close to the conductor 1111. In the illustrated embodiment, shield electrode 1112A is moved closer than shield electrode 1112B due to the force applied by the input object 1104 above the shield electrode 1112A.

As described above, when the shield electrodes 1112A and/or 1112B are floating this causes an increase of charge to build on the floating shield electrodes. Because the shield electrodes are conductive but floating, the charge tends to spread out across the shield electrode(s). Such an increase in charge causes a decrease in the measured trans-capacitance between sensing electrodes. In the embodiment of FIG. 11, the input device 1100 may be operated such that some portion of the sensing region (corresponding to either shield electrode 1112A or 1112B) is sensed in the first operating mode, while the other portion (again, corresponding to either shield electrode 1112B or 1112A) is sensed in the second operating mode. Thus, first-type resulting signals may be generated for some portion of the sensing region, while second-type resulting signals generated for other portions of the sensing region. Such resulting signals are referred to as a "hybrid-type response" and may be used to further determine force information for input objects in multiple regions.

FIGS. 11B and 11C illustrate exemplary hybrid-type responses for the input device 1100 with input object 1104 applying force as illustrated in FIG. 11A. The examples of FIGS. 11B and 11C again illustrate the responses along a cross-section of a sensor (such as what may be associated with a row or column of pixels in an imaging senor), a projection of responses (such as what may be associated with a profile sensor), or some other appropriate one-dimensional representation. Turning now to FIG. 11B, an example of a hybrid-type response 1150 is exemplary of the type of response that would be generated when operating in a hybrid mode with the shield electrode 1112A electrically floating while the shield electrode 1112B is driven to an appropriate electrical potential for shielding. Turning now to FIG. 11C, an example of a hybrid-type response 1160 is exemplary of the type of response that would be generated when operating in a hybrid mode with the shield electrode 1112A driven to an appropriate electrical potential for shielding while the shield electrode 1112B is electrically floating.

As can be seen in FIGS. 11B and 11C, the selective floating and driving of shield electrodes results in a hybrid response with only portions showing the generalized increase resulting from the floating shield electrodes while other portions do not show the generalized increase. This selective generalized increased can be used to determine force information. For example, by providing a mechanism to quantify the generalized increase caused by deflection. When quantified the generalized increase can be used to determine an estimate of the force being applied by the input object.

Embodiments such as that illustrated in FIG. 11 are particularly applicable to implementations where force information for multiple input objects is to be determined Turning to FIG. 11D, the input device 1100 is illustrated with two input objects 1104 and 1105 applying force to the input surface 1106, such that the plurality of sensing electrodes 1108 and shield layer 1110 deflects.

FIGS. 11E and 11F illustrate exemplary hybrid-type responses for the input device 1100 with input objects 1104 and 1105 applying force as illustrated in FIG. 11D. Specifically, FIG. 11E illustrates a hybrid-type response 1170 that is exemplary of the type of response that would be generated when operating in a hybrid mode with the shield electrode 1112A electrically floating while the shield electrode 1112B is driven to an appropriate electrical potential for shielding. Likewise, FIG. 11F illustrates a hybrid-type response 1180 that is exemplary of the type of response that would be generated when operating in a hybrid mode with the shield electrode 1112A driven to an appropriate electrical potential for shielding while the shield electrode 1112B is electrically floating. As can be seen in FIGS. 11E and 11F, the selective floating and driving of shield electrodes results in a hybrid response with only portions showing the generalized increase resulting from the floating shield electrodes while other portions do not show the generalized increased. In the case where there are individual input objects 1104 and 1105 in each of the portions the generalized increases for each portion can be measured and used to determine force information for the individual objects. Thus, the hybrid-type response 1170 can be used to determine force information for input object 1104, while hybrid-type response 1180 can be used to determine force information for input object 1105. Alternatively, information from the hybrid-type responses can be combined. For example, by again providing a mechanism to quantify the generalized increase caused by deflection.

In other embodiments, such hybrid-type responses may be used to determine force estimates for the force applied by each of multiple different individual fingers. As one example, this can be accomplished by using the position of the fingers determined by the sensing electrodes and the multiple hybrid-type responses. In such an embodiment the hybrid-type responses are directly related to the deformation of the shield electrodes that may be caused by multiple individual fingers. For example, to how much, and in what directions the shield electrodes have been displaced (e.g., translated and/or rotated in position relative to a conductor).

As described above, in addition to providing the ability to be selectively floated and driven, in some embodiments the at least one shield electrodes and processing system are implemented such that resulting signals may be received directly using the shield electrodes. In such an implementation these third-type resulting signals may be used to further determine position and/or force information. For example, by measuring the third-types of resulting signals and determining a deflection response from the change in capacitive coupling of the at least one shield electrode to the conductor.

As described above, the input devices are may be implemented such that the plurality of electrodes and the shield layer are configured to deflect toward the conductor in response to force applied by an input object to the input surface. This deflection can take a variety of forms, and can be implemented with a variety of different structures. For example, the input device may be implemented to facilitate bending by the sensing electrodes and shield layer. In other embodiments the input device may be implemented to facilitate substantially rigid motion by the sensing electrodes and shield layer A variety of different configurations and materials may be used to facilitate such deflection. For example, in some embodiments gap layers may be provided to facilitate deflection into the gap layers. In these embodiments the sensing electrodes and/or shield layers deflect into the gap layer when force is applied by the input object. In such embodiments the gap layers may be implemented as air gaps or other with other compressible materials. In other embodiments the gap layers use fluid materials to improve optical viewing of an underlying display. In these embodiments the fluid material does not compress, and thus must be allowed to flow out of the gap layer when deflection occurs.

As described above, in the various embodiments the processing system is configured to selectively operate in a first mode and a second mode. When operating in the first mode the processing system is configured to drive at least one shield electrode to an electrical potential for shielding and to determine position information for objects in the sensing region using the plurality of sensing electrodes. When operating in a second mode the processing system is configured to electrically float the at least one shield electrode and to determine force information for objects in the sensing region using the plurality of sensing electrodes.

In such an input device the processing system may configured to switch between operating modes in a variety of ways and in response to a variety of conditions. For example, the processing system may be configured to operate in the first mode for some determined number of cycles and then switch to the second mode, and vice versa. Such a system would facilitate continual determination of both accurate positional information and force information. In other embodiments, the processing system may default to one mode (for example, the first mode) and switch to the other mode when specific events occur. For example, when it is determined that an input object may be applying force to the input surface, or when an input object is detected in the sensing region. In this embodiment, the mode switch could occur upon a determination that an input object is approaching, touching or applying force. As a third example, when it is determined that noise is present in a resulting signal. In each of these cases the processing system may switch between modes to facilitate effective determination of position information and force information as needed.

As one specific example, the processing system may be configured to dynamically alternate between the first mode and the second mode to predominately provide positional information but also provide regular force information. The ratio of such measurements could be dynamically determined based on what is detected. For example, by increasing the rate of force determination when force is initially determined and for some time after. As another example, increasing a rate of operation in the first mode (as compared to the second mode) in response to an interference determination.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A capacitive input device comprising:
 a plurality of sensing electrodes configured to sense objects in a sensing region;
 a conductor;
 a shield layer comprising at least one shield electrode, the at least one shield electrode disposed between the plurality of sensing electrodes and the conductor;
 a processing system coupled to the plurality of sensing electrodes and the at least one shield electrode, the processing system configured to:
 operate in a first mode, wherein when operating in the first mode the processing system is configured to electrically drive the at least one shield electrode and to determine position information for objects in the sensing region using the plurality of sensing electrodes; and
 operate in a second mode, wherein when operating in the second mode the processing system is configured to electrically float the at least one shield electrode and to determine force information for objects in the sensing region using the plurality of sensing electrodes.

2. The capacitive input device of claim 1 wherein the processing system is configured to determine the force information for objects in the sensing region by determining a deflection response in resulting signals obtained using the plurality of sensing electrodes.

3. The capacitive input device of claim 1 wherein the processing system is further configured to operate in a third mode, wherein when operating in the third mode the processing system is configured to determine the force information for objects in the sensing region using resulting signals obtained using the at least one shield electrode.

4. The capacitive input device of claim 1 wherein the processing system is further configured to switch operation between the first mode and the second mode based at least in part on a determination of input object presence in the sensing region.

5. The capacitive input device of claim 1 wherein the processing system is further configured to switch operation between the first mode and the second mode based at least in part on a determination of noise in resulting signals obtained using the plurality of sensing electrodes.

6. The capacitive input device of claim 1 wherein the at least one shield electrode comprises a plurality of shield electrodes, wherein each of the plurality of shield electrodes are coupled to the processing system, wherein the processing system is configured to electrically float the at least one shield electrode by electrically selectively electrically floating at least one of the plurality of shield electrodes.

7. The capacitive input device of claim 1 further comprising a spacing layer disposed between the shield layer and the conductor, wherein the capacitive input device is configured such that a force applied by an input object to an input surface of the capacitive input device causes a deflection of the plurality of sensing electrodes and the shield layer relative to the conductor.

8. A sensor device comprising:

an input surface;

a plurality of transmitter electrodes and a plurality of receiver electrodes proximate to the input surface, the plurality of transmitter electrodes and the plurality of receiver electrodes configured to capacitively sense objects in a sensing region;

a shield layer comprising at least one shield electrode, the at least one shield electrode disposed proximate the plurality of transmitter electrodes and the plurality of receiver electrodes;

a display disposed proximate the shield layer, wherein the plurality of transmitter electrodes, the receiver electrodes, and the shield layer are configured to deflect toward the display in response to force applied by an input object to the input surface; and a processing system coupled to the plurality of transmitter electrodes, the plurality of receiver electrodes, and the at least one shield electrode, the processing system configured to:

selectively operate in a first mode, wherein when operating in the first mode the processing system electrically drives the at least one shield electrode to an electrical potential while driving the plurality of transmitter electrodes and receiving first type resulting signals using the plurality of receiver electrodes;

selectively operate in a second mode, wherein when operating in the second mode the processing system electrically floats the at least one shield electrode while driving the plurality of transmitter electrodes, and receiving second type resulting signal using the plurality of receiver electrodes;

determine positional information for objects in the sensing region using at least the first type resulting signals; and determine force information for objects in the sensing region using at least the second type resulting signals.

9. A processing system for a capacitive input device comprising:

a sensor module comprising sensor circuitry, the sensor module configured to:

selectively operate in a first mode and a second mode; wherein:

while operating in the first mode, the sensor module is configured to drive a plurality of sensing electrodes configured to sense objects in a sensing region while driving a shield layer to generate resulting signals of a first type indicative of objects in the sensing region;

while operating in the second mode, the sensor module is configured to drive the plurality of sensing electrodes configured to sense objects in the sensing region while floating the shield layer to generate resulting signals of a second type indicative of objects in the sensing region;

a determination module configured to:

determine positional information for objects in the sensing region using at least one of the resulting signals of the first type and the resulting signals of the second type; and determine force information for objects in the sensing region using at least the resulting signals of the second type.

10. The processing system of claim 9 wherein the determination module is configured to determine the force information for objects in the sensing region by determining a deflection response in the resulting signals of the second type.

11. The processing system of claim 9 wherein the sensor module is further configured to operate in a third mode, and while operating in the third mode the sensor module is configured to generate resulting signals of a third type, indicative of objects in the sensing region using signals from at least one shield electrode in the shield layer.

12. The processing system of claim 9 wherein the sensor module is further configured to switch operation between the first mode and the second mode based at least in part on a determination of input object presence in the sensing region.

13. The processing system of claim 9 wherein the sensor module is further configured to switch operation between the first mode and the second mode based at least in part on a determination of noise in at least one of the resulting signals of the second type.

14. The processing system of claim 9 wherein the shield layer comprises a plurality of shield electrodes, and wherein floating the shield layer while operating in the second mode comprises floating at least one of a plurality of shield electrodes in the shield layer.

15. A method for determining input information in a sensing region of a capacitive input device comprising:

driving a plurality of sensing electrodes configured to sense objects in the sensing region while driving a shield layer to generate resulting signals of a first type indicative of objects in the sensing region;

driving the plurality of sensing electrodes configured to sense objects in the sensing region while floating the shield layer to generate resulting signals of a second type indicative of objects in the sensing region;

determining positional information for objects in the sensing region using at least one of the resulting signals of the first type and the resulting signals of the second type; and determining force information for objects in the sensing region using at least the resulting signals of the second type.

16. The method of claim 15 wherein the force information for objects in the sensing region is determined from a deflection response in the resulting signals of the second type.

17. The method of claim 15 further comprises selectively determining the positional information and the force information based on a determination of input object presence in the sensing region.

18. The method of claim 15 wherein the shield layer comprises a plurality of shield electrodes, and wherein floating the shield layer comprises selectively floating at least one of the plurality of shield electrodes in the shield layer.

19. The method of claim 15 further comprising switching between the driving the shield layer to floating the shield layer based at least in part on a determination of input object presence in the sensing region.

\* \* \* \* \*